US009964762B2

(12) United States Patent
Chen

(10) Patent No.: US 9,964,762 B2
(45) Date of Patent: May 8, 2018

(54) ELECTRIC REFLECTIVE PLATE DEVICE

(71) Applicant: E-LEAD ELECTRONIC CO., LTD., Changhua (TW)

(72) Inventor: Stephen Chen, Changhua (TW)

(73) Assignee: E-LEAD ELECTRONIC CO., LTD., Changhua (TW)

( * ) Notice: Subject to any disclaimer, the term of this patent is extended or adjusted under 35 U.S.C. 154(b) by 114 days.

(21) Appl. No.: 14/877,461

(22) Filed: Oct. 7, 2015

(65) Prior Publication Data
US 2017/0102542 A1    Apr. 13, 2017

(51) Int. Cl.
G02B 27/01    (2006.01)
G02B 7/182    (2006.01)

(52) U.S. Cl.
CPC ....... G02B 27/0149 (2013.01); G02B 7/1821 (2013.01); *G02B 2027/0156* (2013.01)

(58) Field of Classification Search
CPC ........ G02B 27/0149; G02B 2027/0156; G02B 2027/0154; G02B 2027/0163; G02B 7/1821; G02B 7/1827; G02B 7/1828; B60K 35/00
See application file for complete search history.

(56) References Cited

U.S. PATENT DOCUMENTS

| 3,429,639 | A | * | 2/1969 | Peters | B60R 1/0612 359/877 |
|---|---|---|---|---|---|
| 5,584,560 | A | * | 12/1996 | Gosswiller | B60Q 1/245 362/233 |
| 7,466,220 | B2 | * | 12/2008 | Aoki | G02B 27/0149 340/438 |
| 2005/0162340 | A1 | * | 7/2005 | Nagano | B60K 35/00 345/7 |
| 2014/0368941 | A1 | * | 12/2014 | Sato | G02B 7/1821 359/877 |
| 2015/0368959 | A1 | * | 12/2015 | Holford | E06B 7/10 49/82.1 |
| 2016/0202472 | A1 | * | 7/2016 | Sasaki | B60K 35/00 353/98 |

FOREIGN PATENT DOCUMENTS

WO    WO 2015033549 A1 *  3/2015 ............. B60K 35/00

* cited by examiner

*Primary Examiner* — Cara Rakowski
(74) *Attorney, Agent, or Firm* — Guice Patents PLLC

(57) ABSTRACT

The invention relates to an electric reflective plate device, which includes a rotary shaft, a reflective plate, a shaft set and a motor module. By the composition of above structure, the flip angle of the reflective plate may be adjusted by the motor module, and the previous flip angle may be memorized every time when the reflective plate is opened, so that the reflective plate may be quickly flipped to a desired angle, to thereby conveniently use a head-up display.

10 Claims, 8 Drawing Sheets

ELECTRIC REFLECTIVE PLATE DEVICE

BACKGROUND OF THE INVENTION a) Field of the Invention

The invention relates to an electric reflective plate device and, more particularly, an electric reflective plate device provided to memorize a previous flip angle, to thereby quickly flip the reflective plate to a desired angle to conveniently use the head up display.

b) Description of the Prior Art

The head-up display device is from the aviation technology originally. The head-up display device may directly project messages in front of the cockpit, and pilots may conveniently obtain desired messages without lowering head to check the messages on the instrument board, pilots can easily combine the messages displayed by the head-up display with the outside scene. Since the image reflected into eyes and the central axis of the aircraft is balanced, the height of pilots may not cause error on pitch angles or visual aim. Therefore, the purpose of the head-up display is that pilots may always keep the head-up posture without lowering head to check the messages displayed on the instrument board, to reduce ignoring the rapid change in the external environment during the interval between lowering head and heading-up, and avoid the delay and discomfort due to eyes focal length is adjusted continuously.

It is one of the biggest main reasons of car accidents that drivers' line of sight is away from the front road when driving. In order to reduce the frequency and duration that drivers' line of sight away from the front road, some car manufacturers equip this kind of head-up display inside the luxury cars, thus, the drivers know the information, such as car speed and engine speed, without moving line of sight away from the front windshield, to maintain traffic safety.

In general driving condition, the shortest time of moving the line of sight away from the front road for reading the information displayed on the instrument board is 0.5 second. For the condition of highway speed of 100 km per hour, the car travels 30 meters per second, and the risk is increased when there are a lot of cars on the road. For safety, the car manufacturers may equip the head-up display in some cars to reduce the distraction of drivers, and the head-up display is used as marking practices to attract consumers.

Recently, the technique of the head-up displays used in the cars is less complicated than the head-up displays equipped in aircrafts. It is one kind of optical system, and generally it is consisted of two main equipments, which are a projector and a combiner. The projector is consisted of signal light sources, projection lens and other optical components. The signal light source of the projector is consisted of LCD monitors or CRT equipments. Light is emitted from the signal light source and projected to the combiner on the glass (or a special transparent screen) by the projector, and the combiner displays words or images.

In the recent years, there are many head-up displays for installation in car in the market. These head-up displays may simply display car speed and engine speed, now display water temperature, throttle position, fuel, over-speed warning, reverse image, battery voltage, and even combine the speed radar. Some products are stressed as quick installation, which are just connected to the car PC without using other cables. In the luxury cars of some car manufacturers, the information of the navigation system, front and rear vehicle distance is added into the information displayed by the head-up display, which is increased a lot of convenience for drivers. Besides, the external head-up displays in the market is various, and the prices are from several hundred dollars for simple function ones, to ten thousand dollars for good quality and versatile ones.

As above, a head-up display equipped in car has gradually become a fashion and trend, but mainly, it may improve driving safety. However, installation method of a general reflective screen provided for a head-up display to project is being attached to the front windshield. There is a drawback in this method that a small part of the driving vision may be covered for urgency and convenience in viewing during using navigation, drivers still hope that the driving vision may not be covered during other time. Thus, a folding reflective plate device has been generated. An advantage of this kind of reflective plate device is that the reflective plate may be folded when the head-up display is not being used, so that the driving vision may not be covered, thus, it may be widely loved by drivers.

In the known folding reflective plate device, a shaft mechanism is mainly used as the mechanism for folding the reflective plate, and related techniques may be referred to cited references TW M395992, TW M393139, TW M398743, TW M273183, TW M305555, TW M248211, TW I352165. Strictly speaking, the reflective plate devices adequately use above related techniques, but there is a common drawback that the rotation angle may need to be adjusted every time, it is really inconvenient.

SUMMARY OF THE INVENTION

In view of this, the inventor finally completes the electric reflective plate device of the present invention after numerous improvements, to thereby quickly flip the reflective plate to a desired angle, to use a head-up display conveniently.

To achieve the above object according to the invention, the first embodiment of the electric reflective plate device according to the invention includes:

a rotary shaft, a shaft inner space is set inside, a first rotary sleeve is set on a side of the rotary shaft;

a reflective plate, a combination unit is set on its one side, and the combination unit is fixedly combined to the first rotary sleeve;

a shaft set, which is set between the rotary shaft and the first rotary sleeve;

a motor module, which is set inside the shaft inner space, a speed-reducing gear, a relative angle sensor and a motor are set in the motor module, the motor is connected to the shaft set;

an absolute angle sensor, which is electrically connected to a circuit board.

The present invention further includes a damper, a groove is set on another side of the rotary shaft, and the damper is set in the groove of the rotary shaft.

In the present invention, a second rotary sleeve is set on another side of the rotary shaft, the absolute angle sensor is set between the rotary shaft and the second rotary sleeve, a D-type shaft is set on the second rotary sleeve, a first D-shaped hole is set on the absolute angle sensor, and the D-type shaft is inserted into the first D-shaped hole.

In the present invention, the motor module further includes a button module, the button module includes a press button, a knob and a flat cable, the flat cable is electrically connected to the circuit board.

The present invention further includes a horizontal adjustment module, the horizontal adjustment module is set on a lower half of the rotary, the horizontal adjustment module includes a horizontal mounting bolt, an adjustment seat and a horizontal adjustment hole, the horizontal adjustment hole is set on the adjustment seat, and the horizontal mounting bolt is inserted into the horizontal adjustment hole.

The invention further includes a base, the base is set under the rotary shaft.

The rotary shaft of the present invention, a first recessed hole is set on its one side, the shaft set is set between the first recessed hole and the first rotary sleeve, the shaft set includes a shaft and an elastic element, the elastic element is slipped on the shaft.

The motor module of the present invention, the motor is electrically connected to the circuit board, the motor is connected to the speed-reducing gear, the relative angle sensor is set inside the motor, the circuit board is set in the shaft inner space or outside of the electric reflective plate device.

The elastic element of the present invention is a torsion spring.

The present invention further includes a cover, and the cover is fixedly fastened to the combination unit.

The second embodiment of the electric reflective plate device according to the invention includes:
a rotary shaft, a shaft inner space is set inside, a first rotary sleeve is set on a side of the rotary shaft;
a reflective plate, a combination unit is set on its one side, and the combination unit is fixedly combined to the first rotary sleeve;
a shaft set, which is set between the rotary shaft and the first rotary sleeve;
a motor module, which is set inside the shaft inner space, a speed-reducing gear, a relative angle sensor and a motor are set in the motor module;
a protection module, which is set between the shaft set and the motor module, the motor is connected to the protection module, the circuit board is set inside the shaft inner space or outside of the electric reflective plate;
an absolute angle sensor, which is electrically connected to a circuit board.

The present invention further includes a damper, a groove is set on another side of the rotary shaft, and the damper is set in the groove of the rotary shaft.

In the present invention, a second rotary sleeve is set on another side of the rotary shaft, the absolute angle sensor is set between the rotary shaft and the second rotary sleeve, a D-type shaft is set on the second rotary sleeve, a first D-shaped hole is set on the absolute angle sensor, and the D-type shaft is inserted into the first D-shaped hole.

In the present invention, the motor module further includes a button module, the button module includes a press button, a knob and a flat cable, the flat cable is electrically connected to the circuit board.

The present invention further includes a horizontal adjustment module, the horizontal adjustment module is set on a lower half of the rotary, the horizontal adjustment module includes a horizontal mounting bolt, an adjustment seat and a horizontal adjustment hole, the horizontal adjustment hole is set on the adjustment seat, and the horizontal mounting bolt is inserted into the horizontal adjustment hole.

The invention further includes a base, the base is set under the rotary shaft.

The rotary shaft of the present invention, a first recessed hole is set on its one side, the shaft set is set between the first recessed hole and the first rotary sleeve, the shaft set includes a shaft and an elastic element, the elastic element is slipped on the shaft.

The motor module of the present invention, the motor is electrically connected to the circuit board, the motor is connected to the speed-reducing gear, the relative angle sensor is set inside the motor.

The protection module of the present invention includes a chain ring cover, a spring and an engaging seat, the spring is set between the engaging seat and the chain ring cover, the engaging seat is connected to the chain ring cover, the chain ring cover is engaged with the shaft set.

The elastic element of the present invention is a torsion spring.

The present invention further includes a cover, and the cover is fixedly fastened to the combination unit.

DETAILED DESCRIPTION OF THE INVENTION

Figure 1:
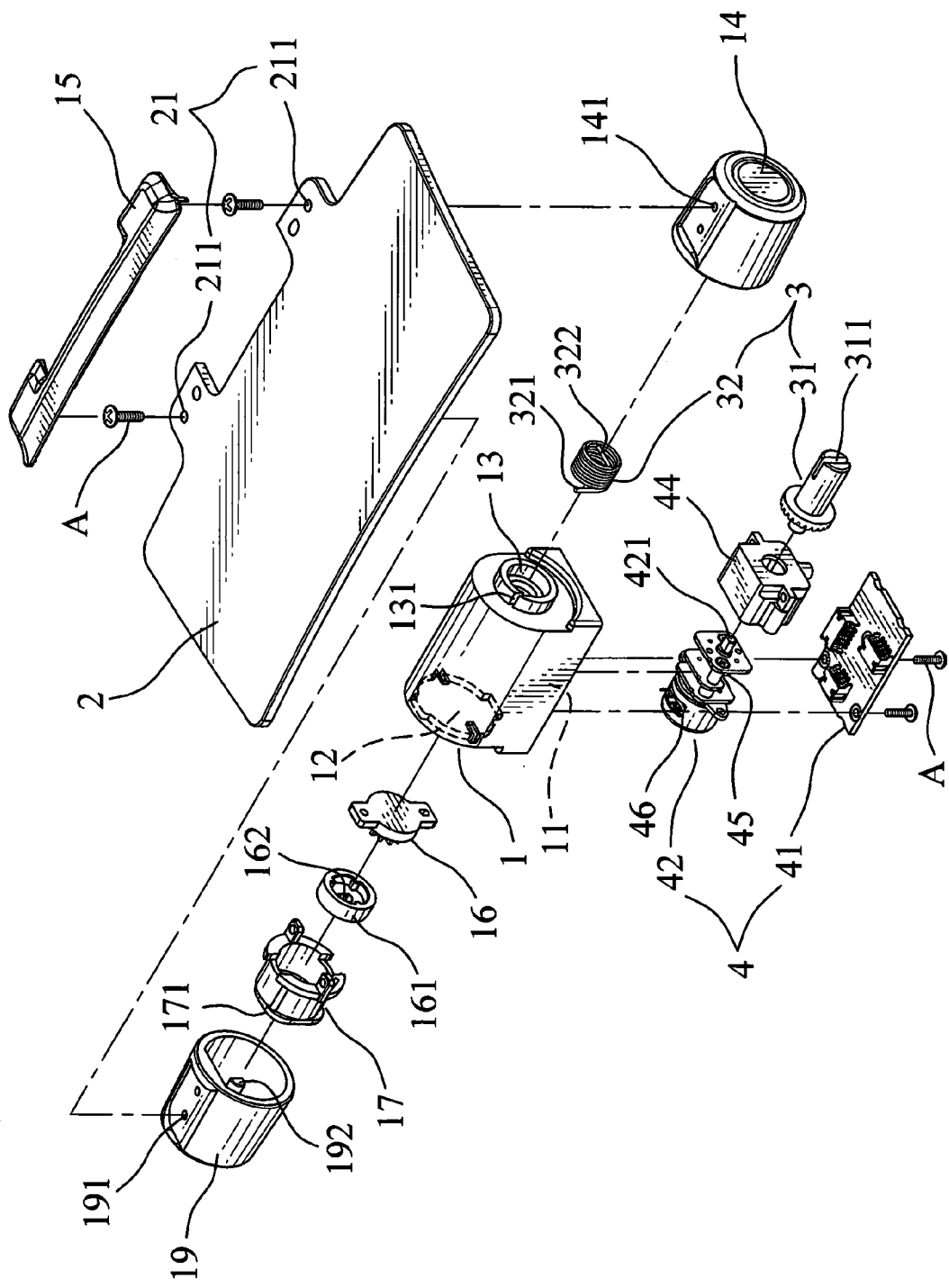
FIG. 1 is a three-dimensional exploded diagram of the first embodiment of the present invention.
Figure 2:
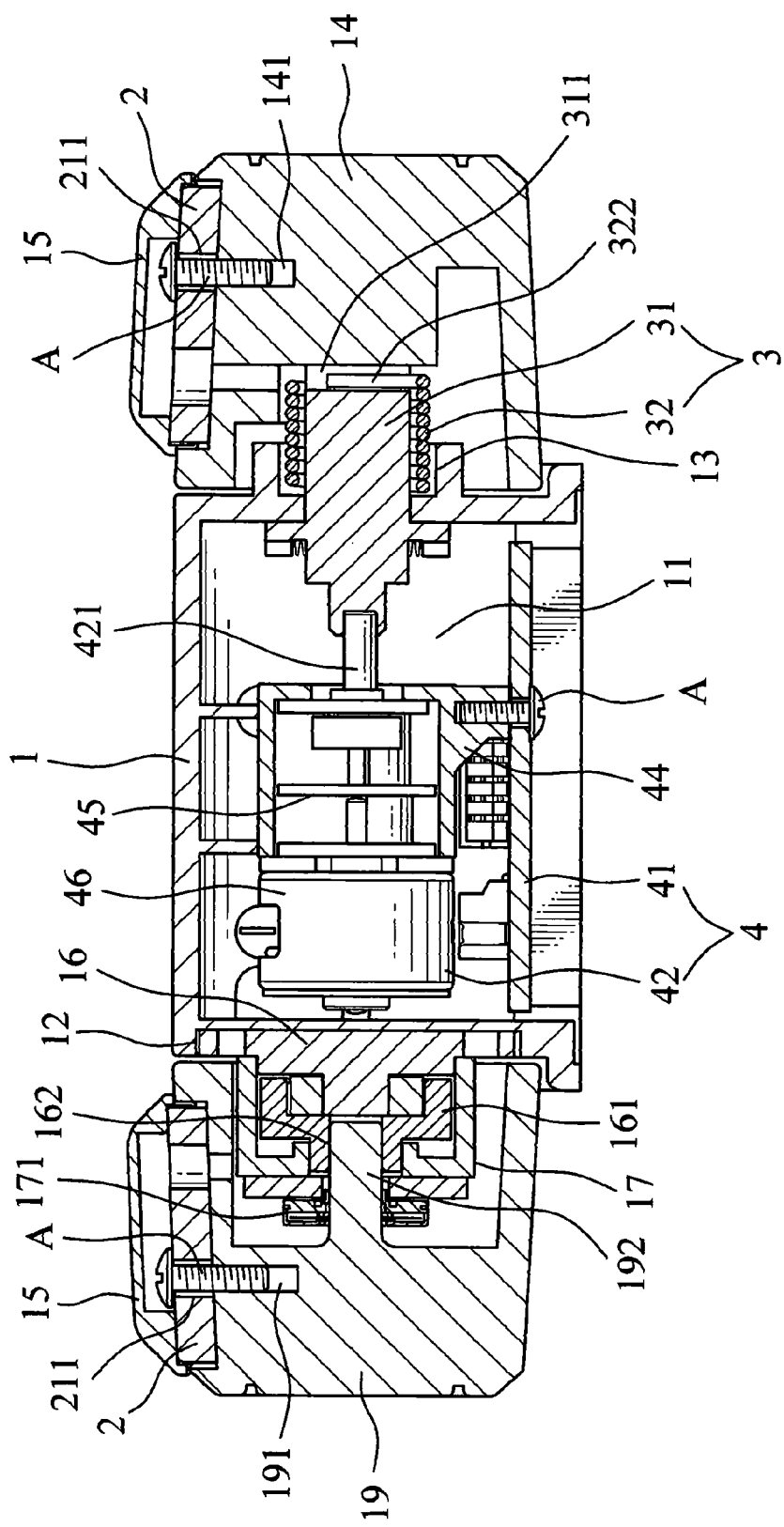
FIG. 2 is a combination cross-sectional schematic diagram of the first embodiment of the present invention.

Please refer to FIG. 1 and FIG. 2, which is the first embodiment of the electric reflective plate device according to the invention, including:
A rotary shaft 1, a shaft inner space 11 is set inside, a first recessed hole 13 is set on a side of the rotary shaft 1, a groove 12 is set on another side of the rotary shaft 1, a first fixing groove 131 is set on the first recessed hole 13, a first rotary sleeve 14 and a second rotary sleeve 19 are respectively set on two sides of the rotary shaft 1, a D-type shaft 192 is set on the second rotary sleeve 19.

A reflective plate 2, a combination unit 21 is set on its one side, the combination unit 21 is combined with the first rotary sleeve 14 and the second rotary sleeve 19, at least a first fixing hole 211 is set on the combination unit 21, the at least a first fixing hole 211 is corresponded to at least a second fixing hole 141 set on the first rotary sleeve 14 and at least a third fixing hole 191 set on the second rotary sleeve 19, for at least a corresponded screw A to fixedly fasten the first fixing hole 211, the second fixing hole 141 and the third fixing hole 191, the combination unit 21 is fixed to a cover 15.

A shaft set 3, which is set between the first recessed hole 13 and the first rotary sleeve 14, the shaft set 3 includes a shaft 31 and an elastic element 31, the elastic element 32 is slipped on the shaft 31, a second fixing groove 311 is set on the shaft 31, the elastic element 32 is a torsion spring, a first fixed end 321 and a second fixed end 322 are set on the elastic element 32, the second fixed end 322 is set on the second fixing groove 311 of the shaft 31, the first end 321 is set on the first fixing groove 131 of the first recessed hole 13, the shaft 31 is fixed inside the first rotary sleeve 14. Due to level principle, there is a large shaking space for upper part of the reflective plate 2, the reflective plate 2 buffered by elasticity of the elastic element 32 may not easily be shaken during driving.

An absolute angle sensor 17, the absolute angle sensor 17 is set between the rotary shaft 1 and the second rotary sleeve 19, a first D-shaped hole 171 is set on the absolute angle sensor 17, the D-type shaft 192 is inserted into the first D-shaped hole 171 and electrically connected to a circuit board 41, the circuit board is set in the shaft inner space or outside of the electric reflective plate device, the absolute angle sensor 17 is used to detect the flip angle of the reflective plate 2.

A motor module 4, which includes a motor fixed seat 44, a speed-reducing gear 45, a relative angle sensor 46 and a motor 42, the motor module 4 is set inside the shaft inner space 11, the motor 42 is electrically connected to the circuit 41, the motor 42 connected to the speed-reducing gear 45 is used as rotational power of the device of the present invention, the relative angle sensor 46 is set inside the motor 42, the motor 42 is slipped inside the fixed seat 44 and fixed to the circuit board 41 with the screw A, a main shaft 421 is set on the motor 42, the main shaft 421 is connected to the shaft 31 of the shaft set 3 and the shaft 31 is driven by the main shaft 421 to drive the first rotary sleeve 14 rotating, to thereby connect the reflective plate 2 to adjusting the flip angle. The relative angle sensor 46 detects the rotational angle of the motor 42, so that it is accurate to determine the angle. The relative angle is provided for accurately flipping and folding the reflective plate 2, so that the angle of the reflective plate 2 may be the same as last time in each time the car starts, for example, the angle is turned 90 degrees upward when car starts, and then the angle may be turned 90 degrees down when car stops.

The present invention further includes a damper 16, the damper 16 is set in the groove 12 of the rotary shaft 1, the damper 16 further includes an inner cover 161 and a second D-shaped hole 162, the inner cover 161 is slipped on the damper 16. The D-shaped shaft 192 is inserted into the second D-shaped hole 162. The damper 16 is a mechanism for reducing shaking, the property of the damper 16 is that the damping force is smaller under low speed and the damping force is larger under high speed. The motion of the reflective plate 2 is low speed, the damping force is small, so the effect is limited; when shake is caused by rotating with high speed, the damping force is large, so the shake may be significantly reduced.

Figure 3:
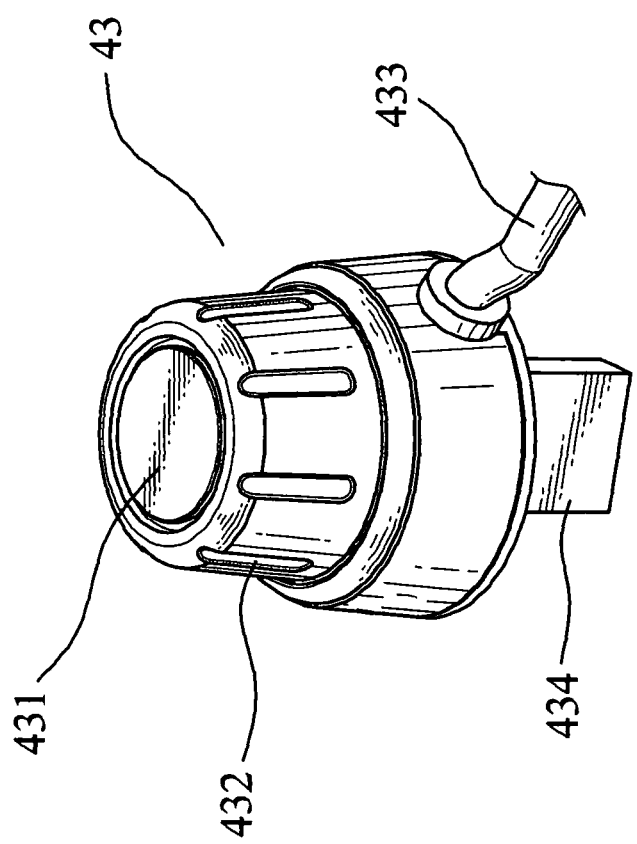
FIG. 3 is a schematic diagram of three-dimensional appearance of the button module of the present invention.

As shown in FIG. 3, the motor module 4 further includes a button module 43, the button module 3 includes a press button 431, a knob 432, a flat cable 433 and a power plug 434. The flat cable 433 is electrically connected to the circuit board 41 of the motor module 4. The power plug 434 may be a USB plug or a cigarette plug, which is used to provide power to the motor module 4. The press button 431 is used as a control switch of the motor module 4 for switching ON or OFF, the knob 432 is used as a control switch for adjusting the flip angle of the reflective 2. The reflective plate 2 may be folded automatically when the press button 431 is pressed for turning OFF, and the reflective plate 2 may be flipped to the previous flip angle when the press button 431 is pressed for turning ON.

Figure 6:
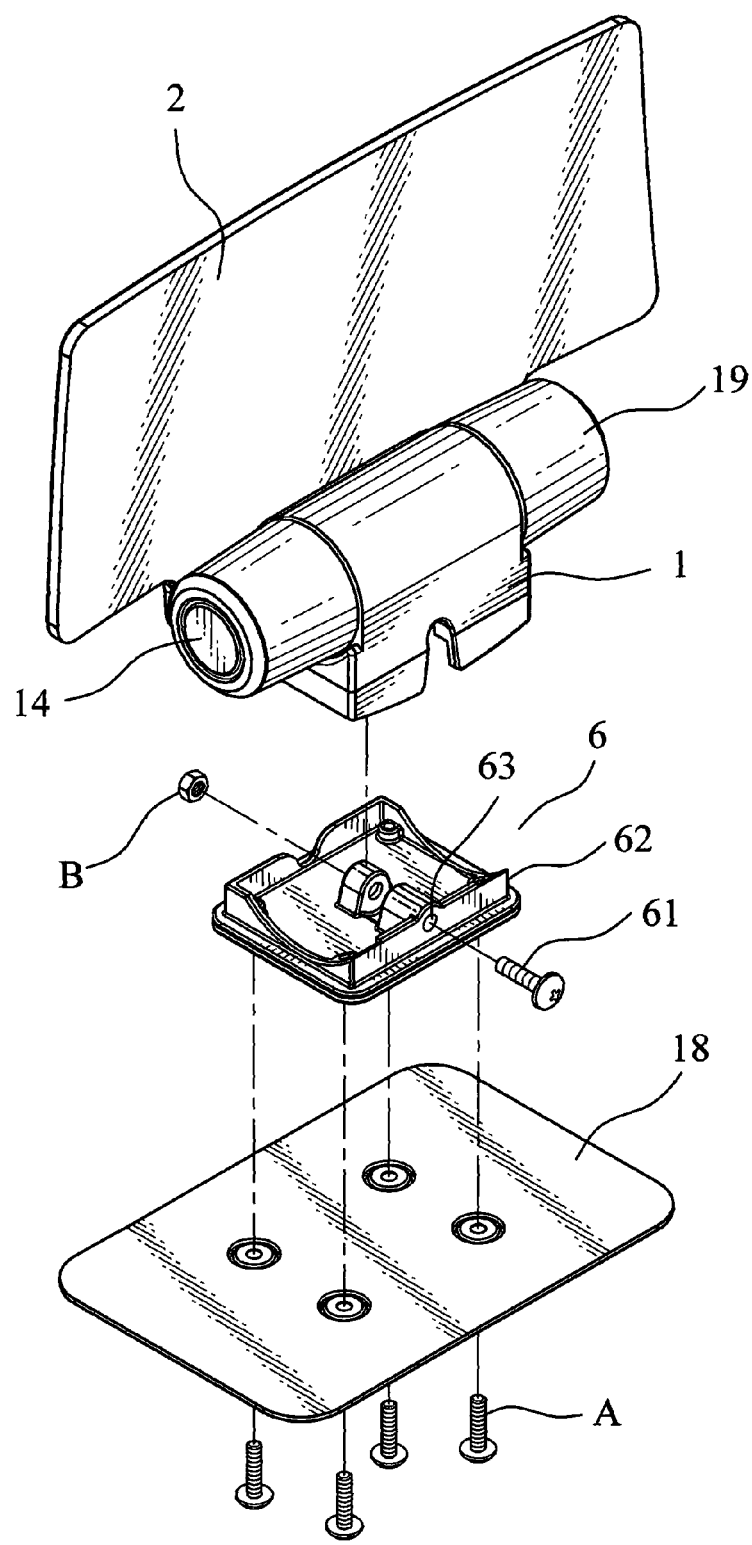
FIG. 6 is an exploded schematic diagram of the horizontal adjustment module of the present invention.
Figure 7:
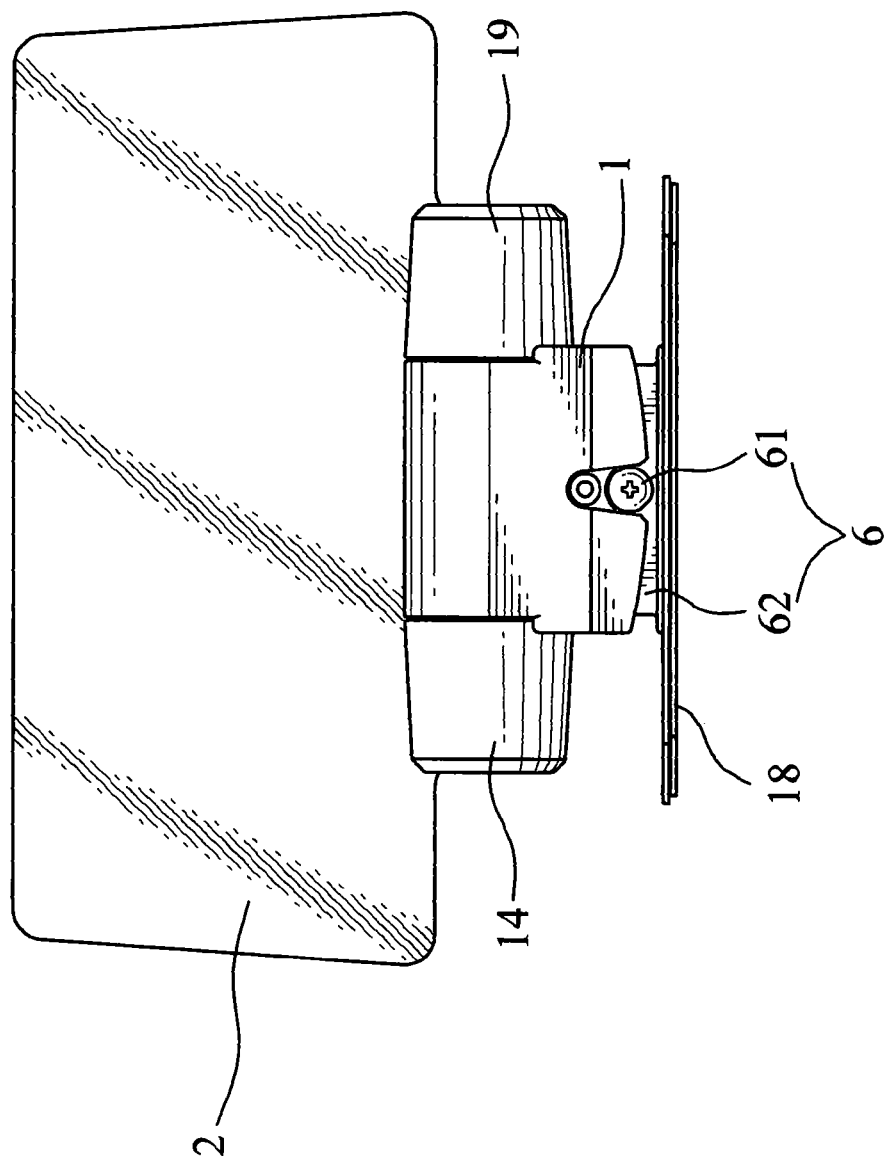
FIG. 7 is a schematic diagram of two-dimensional appearance of the present invention.
Figure 8:
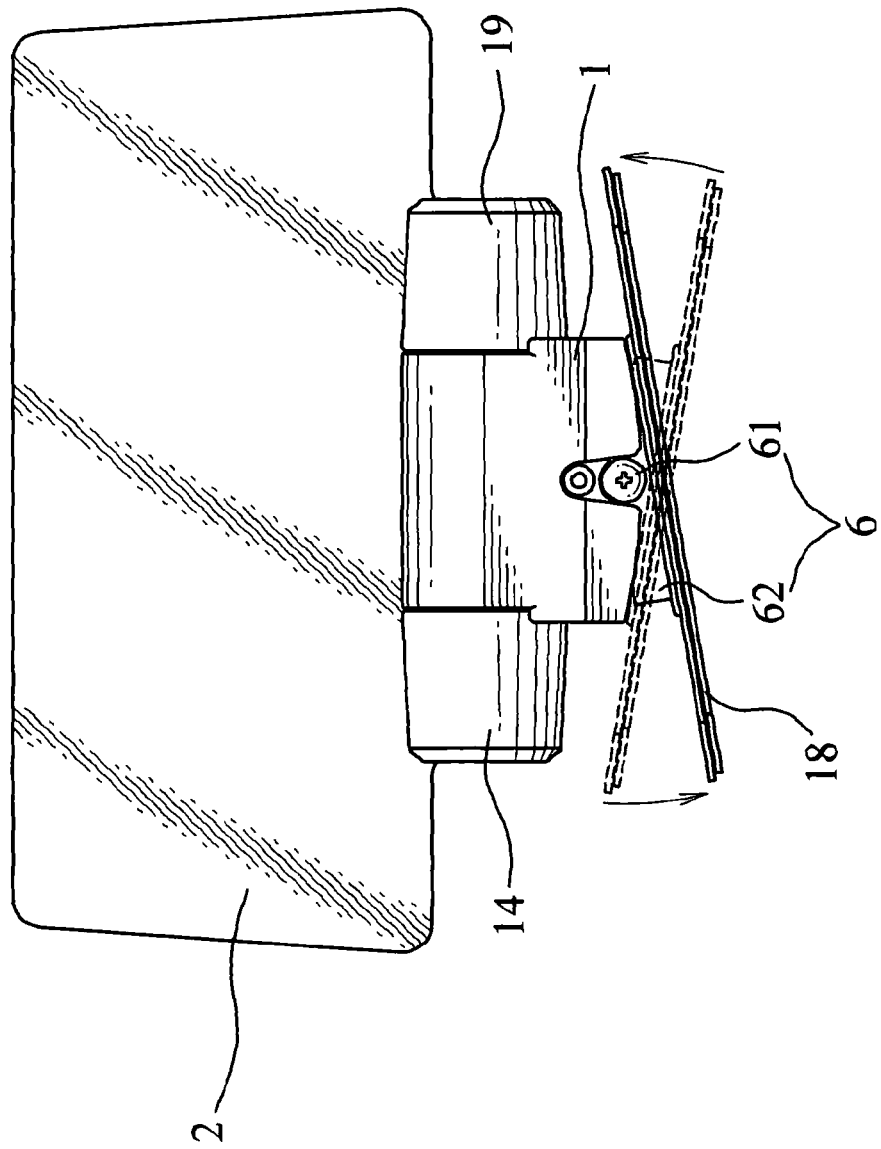
FIG. 8 is a schematic diagram of horizontal adjustment of the horizontal adjustment module of the present invention.

As shown as FIG. 6, FIG. 7, FIG. 8, the invention further includes a base 18, the base 18 is set under the rotary shaft 1, the base 18 may be fixed to dashboard under the windshield by using double-sided tape.

As shown in FIG. 6, FIG. 7, FIG. 8, the present invention further includes a horizontal adjustment module 6, the horizontal adjustment module 6 is set on lower half of the rotary shaft 1, the horizontal adjustment module 6 includes a horizontal mounting bolt 61, an adjustment seat 62 and a horizontal adjustment hole 63, the horizontal adjustment hole 63 is set on the adjustment seat 62, the horizontal mounting bolt 61 is inserted into the horizontal adjustment hole 63 and combined with a nut B, so that the horizontal angle of the adjustment seat 62 may be adjusted by loosening the horizontal mounting bolt 61, the horizontal angle may be fixed by tightening the horizontal mounting bolt 61 when the desired horizontal position is adjusted, to thereby conveniently perform the installation and adjustment of the present invention, the base 18 is fixedly connected to the horizontal adjustment module 6 and the rotary shaft 1 through the screw A.

By the composition of above elements, users may only press the press button 431 when they need watch a head-up display provided by the present invention, the motor module 4 is switched ON, and the motor module 4 drive the main shaft to rotate at this time, and the shaft 31 and the first rotary sleeve 14 are driven to connect the reflective plate 2, the reflective plate 2 is flipped to the previous flip angle and the stops. If users want to change the flip angle of the reflective plate 2, the knob 432 is provided to be rotated for control and adjust the flip angle of the reflective plate 2. When users do not want to use the reflective plate 2, they can press the press button 431 again, and the reflective plate 2 may be automatically folded and the motor module 4 may be switched OFF.

Figure 4:
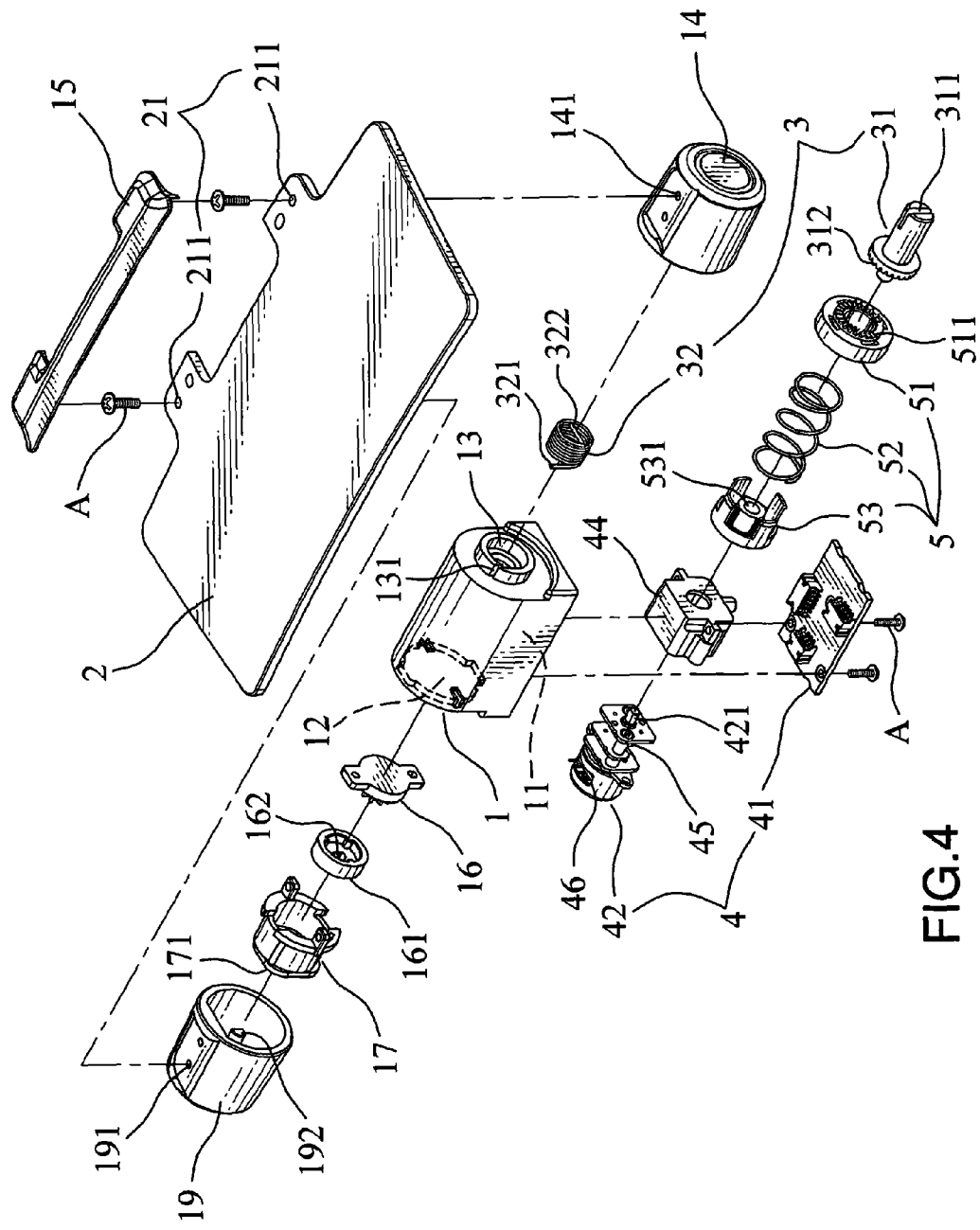
FIG. 4 is a three-dimensional exploded diagram of the second embodiment of the present invention.
Figure 5:
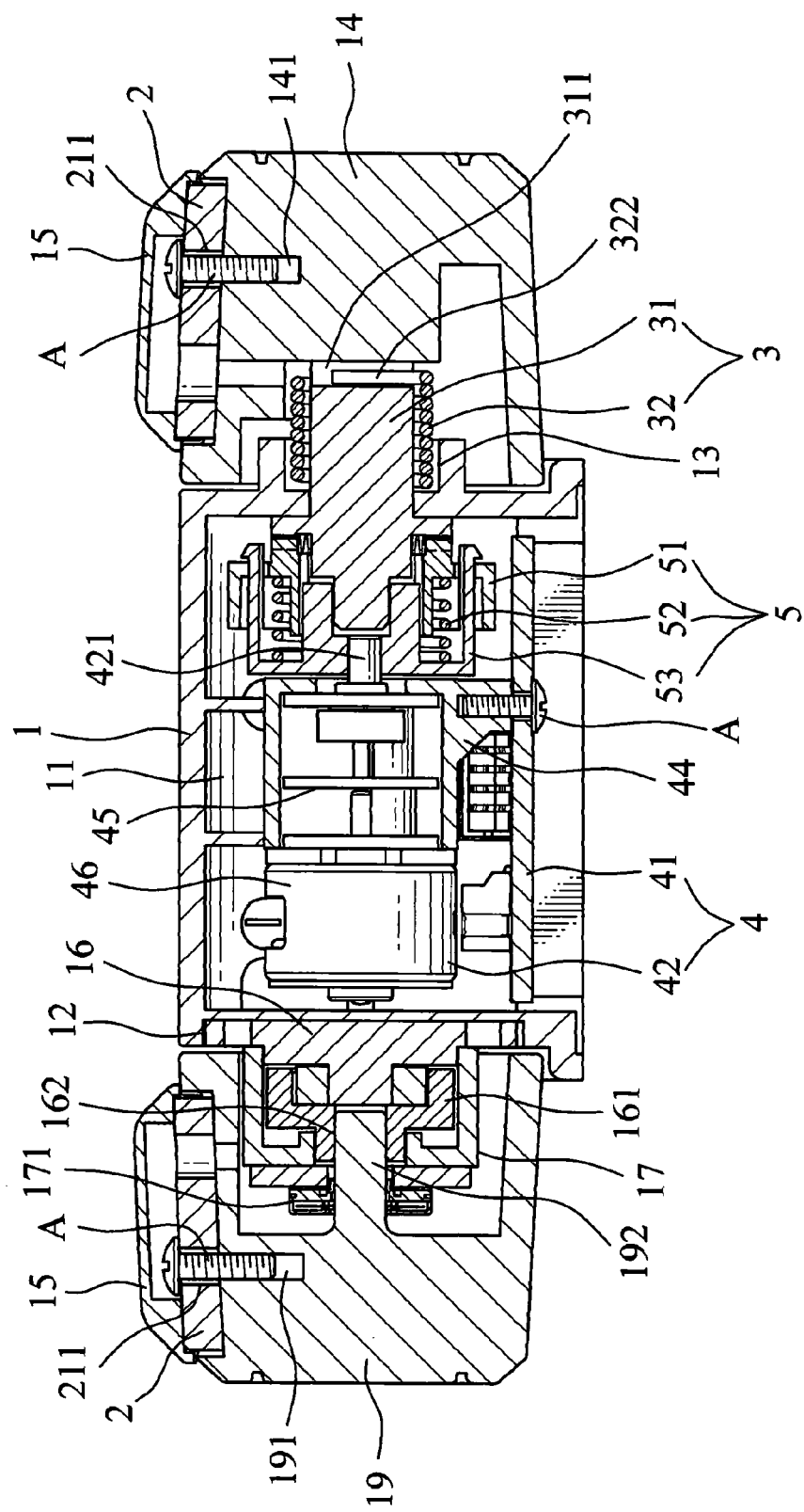
FIG. 5 is a combination cross-sectional schematic diagram of the second embodiment of the present invention.

Please refer to FIG. 4, FIG. 5, which is the second embodiment of the electric reflective plate of the present invention, including:

a rotary shaft 1, a shaft inner space 11 is set inside, a first recessed hole 13 is set on a side of the rotary shaft 1, a groove 12 is set on another side of the rotary shaft 1, a first fixing groove 131 is set on the first recessed hole 13, a first rotary sleeve 14 and a second rotary sleeve 19 are respectively set on two sides of the rotary shaft 1, a D-type shaft 192 is set on the second rotary sleeve 19;

a reflective plate 2, a combination unit 21 is set on its one side, the combination unit 21 is combined with the first rotary sleeve 14 and the second rotary sleeve 19, at least a first fixing hole 211 is set on the combination unit 21, the at least a first fixing hole 211 is corresponded to at least a second fixing hole 141 set on the first rotary sleeve 14 and at least a third fixing hole 191 set on the second rotary sleeve 19, for at least a corresponded screw A to fixedly fasten the first fixing hole 211, the second fixing hole 141 and the third fixing hole 191, the combination unit 21 is fixed to a cover 15;

a shaft set 3, which is set between the first recessed hole 13 and the first rotary sleeve 14, the shaft set 3 includes a shaft 31 and an elastic element 31, the elastic element 32 is slipped on the shaft 31, a second fixing groove 311 is set on the shaft 31, the elastic element 32 is a torsion spring, a first fixed end 321 and a second fixed end 322 are respectively set on two sides of the elastic element 32, the second fixed end 322 is set on the second fixing groove 311 of the shaft 31, the first end 321 is set on the first fixing groove 131 of the first recessed hole 13, the shaft 31 is fixed inside the first rotary sleeve 14.

A motor module 4, which includes a motor fixed seat 44, a speed-reducing gear 45, a relative angle sensor 46 and a motor 42, the motor module 4 is set inside the shaft inner space 11, the motor 42 is electrically connected to the circuit 41, the circuit board may be set in the shaft inner space or outside of the electric reflective plate device, a main shaft 421 is set on the motor 42, the motor 42 connected to the speed-reducing gear 45 is used as rotational power of the device of the present invention, the relative angle sensor 46 is set inside the motor 42, the motor 42 is slipped inside the fixed seat 44 and fixed to the circuit board 41 with the screw A. The relative angle sensor 46 detects the rotational angle of the motor 42, so that it is accurate to determine the angle. The relative angle is provided for accurately flipping and folding the reflective plate 2, so that the angle of the reflective plate 2 may be the same as last time in each time the car starts, for example, the angle is turned 90 degrees upward when car starts, and then the angle may be turned 90 degrees down when car stops.

A protection module 5 includes a chain ring cover 51, a spring 52 and an engaging seat 53, the spring 52 is set between the engaging seat 53 and the chain ring cover 51, the engaging seat 53 is connected to the chain ring cover 51, a chain ring 511 is set on the chain ring cover 51, the chain ring 511 of the chain ring cover 51 is engaged with the gear 312 of the shaft 31, an engaging hole 531 is set on the engaging seat 53, the main shaft 421 of the motor is connected to the engaging hole 531 of the protection module 5. When the main shaft 421 of the motor 4 rotates, the protection module 5 rotates synchronously and drives the shaft 31 to drive the rotary sleeve 14 rotating, to thereby connect the reflective plate 2 to adjusting the flip angle. When the external force applied on the reflective plate 2 is larger than a predetermined value, the chain ring cover 51 escapes from the gear 312 of the shaft 31 and moves inwards, and the spring 52 of the protection module 5 may be pressed, to thereby prevent the reflective plate 2 or the motor 42 of the motor module 4 being damaged by external force. When external force is removed, the spring 52 separates the engaging seat 53 and the chain ring cover 51 with its elasticity, the chain ring cover 51 is engaged with the gear 312 of the shaft 31 again. Because there is a slight gap between the chain ring cover 51 and the gear 312, there is a large shaking space for upper part of the reflective plate 2 due to level principle, the reflective plate 2 may be pushed to the chain ring cover 51 and touched a side of teeth gap of the gear 312 by using the elastic element 32, the reflective plate 2 buffered by elasticity of the elastic element 32 may not easily be shaken during driving simultaneously.

An absolute angle sensor 17, which is set between the base 1 and the second rotary sleeve 19. A first D-shaped hole 171 is set on the absolute angle sensor 17. The D-type shaft 192 is inserted into the first D-shaped hole 171 and electrically connected to the circuit board 41. The absolute angle sensor is used to detect the flip angle of the reflective plate 2. When external force enforces to flip the reflective plate 2, the protection module 5 may let the reflective plate 1 and the motor module 4 be skidded, the motor 42 of the motor module 4 may not be damaged, but the angle may be changed. For example, the reflective plate 2 is enforced to flip 30 degrees downwards when the device starts, the motor module 4 may be damaged if the motor 42 of the motor module 4 is flipped 90 degrees downwards when the device closes, the absolute angle sensor 17 is provided to detect that the reflective plate 2 cannot be flipped anymore and stops rotating.

The present invention further includes a damper 16, the damper 16 is set in the groove 12 of the rotary shaft 1, the damper 16 further includes an inner cover 161 and a second D-shaped hole 162, the inner cover 161 is slipped on the damper 16. The D-type shaft 192 is inserted into the second D-shaped hole 162. The damper 16 is a mechanism for reducing shaking, the property of the damper 16 is that the damping force is smaller under low speed and the damping force is larger under high speed. The motion of the reflective plate 2 is low speed, the damping force is small, so the effect is limited; when shake is caused by rotating with high speed, the damping force is large, so the shake may be significantly reduced.

As shown in FIG. 3, the motor module 4 further includes a button module 43, the button module 3 includes a press button 431, a knob 432, a flat cable 433 and a power plug 434. The flat cable 433 is electrically connected to the circuit board 41 of the motor module 4. The power plug 434 may be a USB plug or a cigarette plug, which is used to provide power to the motor module 4. The press button 431 is used as a control switch of the motor module 4 for switching ON or OFF, the knob 432 is used as a control switch for adjusting the flip angle of the reflective 2. The reflective plate 2 may be folded automatically when the press button 431 is pressed for turning OFF, and the reflective plate 2 may be flipped to the previous flip angle when the press button 431 is pressed for turning ON.

As shown as FIG. 6, FIG. 7, FIG. 8, the invention further includes a base 18, the base 18 is set under the rotary shaft 1, the base 18 may be fixed to dashboard under the windshield by using double-sided tape.

As shown in FIG. 6, FIG. 7, FIG. 8, the present invention further includes a horizontal adjustment module 6, the horizontal adjustment module 6 is set on lower half of the rotary shaft 1, the horizontal adjustment module 6 includes a horizontal mounting bolt 61, an adjustment seat 62 and a horizontal adjustment hole 63, the horizontal adjustment hole 63 is set on the adjustment seat 62, the horizontal mounting bolt 61 is inserted into the horizontal adjustment hole 63 and combined with a nut B, so that the horizontal angle of the adjustment seat 62 may be adjusted by loosening the horizontal mounting bolt 61, the horizontal angle may be fixed by tightening the horizontal mounting bolt 61 when the desired horizontal position is adjusted, to thereby conveniently perform the installation and adjustment of the present invention, the base 18 is fixedly connected to the horizontal adjustment module 6 and the rotary shaft 1 through the screw A.

By the composition of above elements, users may only press the press button 431 when they need watch a head-up display provided by the present invention, the motor module 4 is switched ON, and the motor module 4 drive the main shaft to rotate at this time, and the shaft 31 and the first rotary sleeve 14 are driven to connect the reflective plate 2, the reflective plate 2 is flipped to the previous flip angle and the stops. If users want to change the flip angle of the reflective plate 2, the knob 432 is provided to be rotated for control and adjust the flip angle of the reflective plate 2. When users do not want to use the reflective plate 2, they can press the press button 431 again, and the reflective plate 2 may be automatically folded and the motor module 4 may be switched OFF.

Above all, the electric reflective plate device of the present invention, the reflective plate 2 buffered by elasticity of the elastic element 32 may not easily be shaken during driving, the motor module is provided to adjust the flip angle of the reflective plate, further, through the chain ring cover of the protection module and the gear of the shaft, the reflective plate or the motor module may be prevented from being damaged by external force. Besides, the horizontal adjustment module of the present invention may provide to adjust horizontal angle for facilitating the installation of the present invention. The conventional drawbacks may be solved by using the present invention, and the technical means have not discloses in prior art, thus the present invention has novelty and non-obviousness of patent.

The embodiments disclosed in the present invention is only used to illustrate the technical content of the present invention, not limited the present invention into above embodiments. Various applications under spirits of the present invention and the following claims, for example, the seat and the adjustment seat are designed as injection molding or the absolute angle sensor is changed to set between the rotary shaft and the first rotary sleeve, may still belong to the scope of the present invention.

What is claimed is:

1. An electric reflective plate device, includes:
   a rotary shaft, a shaft inner space is set inside, a first rotary sleeve is set on a side of the rotary shaft;
   a reflective plate, a combination unit is set on its one side, and the combination unit is fixedly combined to the first rotary sleeve;
   a shaft set, which is set between the rotary shaft and the first rotary sleeve;
   a motor module, which is set inside the shaft inner space, a speed-reducing gear, a relative angle sensor and a motor are set in the motor module;
   a protection module, which is set between the shaft set and the motor module, the motor is connected to the protection module;
   an absolute angle sensor, which is electrically connected to a circuit board;
   wherein a second rotary sleeve is set on another side of the rotary shaft, the absolute angle sensor is set between the rotary shaft and the second rotary sleeve, a D-type shaft is set on the second rotary sleeve, a first D-shaped hole is set on the absolute angle sensor, and the D-type shaft is inserted into the first D-shaped hole.

2. The electric reflective plate device as claimed in claim 1, further includes a damper, a groove is set on the side of the rotary shaft on which the second rotary sleeve is set, the damper is set in the groove of the rotary shaft.

3. The electric reflective plate device as claimed in claim 1, the motor module further includes a button module, the button module includes a press button, a knob and a flat cable, the flat cable is electrically connected to the circuit board.

4. The electric reflective plate device as claimed in claim 1, further includes a horizontal adjustment module, the horizontal adjustment module is set on a lower half of the rotary shaft, the horizontal adjustment module includes a horizontal mounting bolt, an adjustment seat and a horizontal adjustment hole, the horizontal adjustment hole is set on the adjustment seat, and the horizontal mounting bolt is inserted into the horizontal adjustment hole.

5. The electric reflective plate device as claimed in claim 1, further includes a base, the base is set under the rotary shaft.

6. The electric reflective plate device as claimed in claim 1, wherein a first recessed hole is set on a side of the rotary shaft, the shaft set is set between the first recessed hole and the first rotary sleeve, the shaft set includes a shaft and an elastic element, the elastic element is slipped on the shaft.

7. The electric reflective plate device as claimed in claim 1, wherein the motor is electrically connected to the circuit board, the motor is connected to the speed-reducing gear, the relative angle sensor is set inside the motor, the circuit board is set in the shaft inner space or outside of the electric reflective plate device.

8. The electric reflective plate device as claimed in claim 1, wherein the protection module includes a chain ring cover, a spring and an engaging seat, the spring is set between the engaging seat and the chain ring cover, the engaging seat is connected to the chain ring cover, the chain ring cover is engaged with the shaft set.

9. The electric reflective plate device as claimed in claim 1, wherein the shaft set includes a shaft and an elastic element, the elastic element is a torsion spring.

10. The electric reflective plate device as claimed in claim 1, further includes a cover, the cover is fixedly fastened to the combination unit.

* * * * *